United States Patent [19]

Götz et al.

[11] Patent Number: 5,207,455
[45] Date of Patent: May 4, 1993

[54] SPLASHED WATER COLLECTING AND DISCHARGING DEVICE FOR A MOTOR VEHICLE

[75] Inventors: Hans Götz, Böblingen; Klaus Müller, Nagold, both of Fed. Rep. of Germany

[73] Assignee: Mercedes-Benz AG, Fed. Rep. of Germany

[21] Appl. No.: 789,845

[22] Filed: Nov. 8, 1991

[30] Foreign Application Priority Data

Nov. 10, 1990 [DE] Fed. Rep. of Germany ....... 4035854

[51] Int. Cl.$^5$ .............................................. B62B 9/16
[52] U.S. Cl. ................................ 280/848; 280/847
[58] Field of Search ................ 280/847, 848, 849, 850, 280/851

[56] References Cited

U.S. PATENT DOCUMENTS

| 1,828,451 | 10/1931 | Shreffler | 280/847 |
|---|---|---|---|
| 3,341,222 | 9/1967 | Roberts | 280/851 |
| 3,834,732 | 9/1974 | Schons | 280/851 |
| 4,205,861 | 6/1980 | Roberts et al. | 280/851 |
| 4,290,619 | 9/1981 | Goodall | 280/851 |
| 4,436,319 | 3/1984 | Clutter | 280/851 |

FOREIGN PATENT DOCUMENTS

| 0080735 | 3/1956 | Denmark | 280/847 |
|---|---|---|---|
| 0081091 | 9/1956 | Denmark | 280/847 |
| 0150588 | 8/1985 | European Pat. Off. | |
| 0233496 | 8/1987 | European Pat. Off. | 280/851 |
| 0353494 | 2/1990 | European Pat. Off. | |
| 0396933 | 11/1990 | European Pat. Off. | |
| 2045212 | 3/1971 | Fed. Rep. of Germany | |
| 3922715 | 2/1990 | Fed. Rep. of Germany | |
| 2004823 | 4/1979 | United Kingdom | |
| 2050272 | 1/1981 | United Kingdom | |
| 1584453 | 2/1981 | United Kingdom | |
| 2078181 | 1/1982 | United Kingdom | |
| 2114075 | 8/1983 | United Kingdom | 280/851 |
| 2146598 | 4/1985 | United Kingdom | 280/851 |
| 2165508 | 4/1986 | United Kingdom | 280/851 |
| 2229689 | 10/1990 | United Kingdom | |

*Primary Examiner*—Brian Johnson
*Attorney, Agent, or Firm*—Evenson, McKeown, Edwards & Lenahan

[57] ABSTRACT

A device collects and discharges the splashed water thrown up by a vehicle wheel, and comprises a plurality of collection channels which are disposed side by side and spaced apart. The channels are held on the wheel arch of the vehicle in a position facing a tire tread, and collection channel openings, inclined downwards in their longitudinal direction, are each covered over by a respective recessed rebound wall on which a part of the impinging splashed water is thrown back into the associated collection channel. In order to enable greater efficiency of the device in the collection of splashed water to be achieved, the rebound walls associated with the collection channels are each, as viewed in cross-section, in the form of arcuately curved guide vanes, whereby a major part of the impinging splashed water is deflected by return flushing into the collection channel openings.

12 Claims, 2 Drawing Sheets

SPLASHED WATER COLLECTING AND DISCHARGING DEVICE FOR A MOTOR VEHICLE

BACKGROUND AND SUMMARY OF THE INVENTION

The present invention relates to device for collecting and discharging the splashed water thrown up by a vehicle wheel and, more particularly, to a device having a plurality of collection channels spaced apart side by side and which are held on the wheel arch of the vehicle in a position facing the tire tread.

German Offenlegungsschrift 39 22 715 shows collection channels extending in a direction of the width of the wheel arch, i.e. transversely to the direction of travel. Since the collection channels are inclined downwards in their longitudinal direction, the splashed water collected runs in the channels to the inside of the wheel arch, where it is received by an edge channel formed on the inside of the fender and discharged to the roadway.

For the splashed water thrown between neighboring collection channels to be able to pass into the collection channels, the water must be thrown into the collection channel opening almost exclusively by rebounding from a rebound wall. Since the drops of splashed water impinging on the rebound wall are broken up into smaller drops of splashed water by rebounding on the rebound wall, a considerable amount of these drops of splashed water is thrown back into the collection passage lying between the neighboring collection channels, so that the efficiency of the conventional device is considerably impaired.

It is, therefore, an object of the present invention to provide a device for collecting and discharging the splashed water thrown up by a vehicle wheel, such that its efficiency in collecting the splashed water can be markedly improved.

The foregoing object has been achieved in accordance with the present invention by providing rebound walls associated with the collection channels and in the form of arcuately curved guide vanes. Through the formation of the rebound walls as guide vanes in accordance with the present invention, the major part of the drops of splashed water passing through the collection passage impinge at a flat angle on the associated guide vane, so that their direction of movement can be reversed by the sliding of the drops of splashed water along the guide vane.

A particularly problem-free transition between the guide vane and the associated collection channel is obtained if one edge side of the guide vane merges with a flush surface into a lateral boundary wall of the collection channel. In addition, the collection channel can in this case be fastened by the guide vanes.

In order to make possible inexpensive manufacture of the device, the collection channel may be formed integrally on the guide vane. If one-piece manufacture is effected by an extrusion process, the one-piece manufacture of the entire assembly of guide vanes and collection channels is also possible, in which case in the interest of advantageous consumption of material, the guide vanes may also have a semicircular cross-section.

In order to ensure that no drops of splashed water will be flushed out of the collection channels, even when the splashed water is thrown up at high speed, the collection channels advantageously have a V-shaped cross-section, while their freely projecting boundary wall is provided with a deflector edge by which splashed water flushed up on said boundary wall is deflected back into the wedge-shaped cross-section of the collection channel. It is advantageous for this deflector edge to be curved in the shape of a hook and to be formed integrally on the boundary wall of the collection channel.

For the purpose of enabling the device to be given a particularly advantageous overall height above the wheel, the collection channels extend parallel to the central longitudinal axis of the base vehicle while, viewed over their length, they are curved substantially concentrically to the rolling periphery of the wheel. In this situation, the curvature ensures an adequate downward incline of the collection channels to effect rapid discharge of the water.

The device of the present invention is preferably provided at its bottom end or at its bottom ends with a water chamber from which the splashed water can flow off to the roadway at the side of the wheel track.

In order to improve the absorptive capacity of the device in the region of greatest accumulation of splashed water behind the wheel, some or all of the deflector vanes may have one or more overflow openings passing through them to an outlet lying behind them. Through the action of these overflow openings, a part of the splashed water thrown into the guide vanes passes directly into the outlet duct. The deflection function of the deflector vanes must, however, be maintained, for which reason the overflow openings should preferably be in the form of narrow slots.

The outlet duct is advantageously in the form of a U-shaped tray-like member having a flat rectangular cross-section, in the bottom end region of which a water chamber having a lateral outlet opening is also integrated. The devices and the tray-like member may also expediently be combined to form a constructional unit, so that installation in the wheel arch entails the attachment of only one component.

BRIEF DESCRIPTION OF THE DRAWINGS

These and further objects, features and advantages of the present invention will become more apparent from the following detailed description of a presently preferred embodiment when taken in conjunction with the accompanying drawings wherein.

DETAILED DESCRIPTION OF THE DRAWINGS

Figure 1:
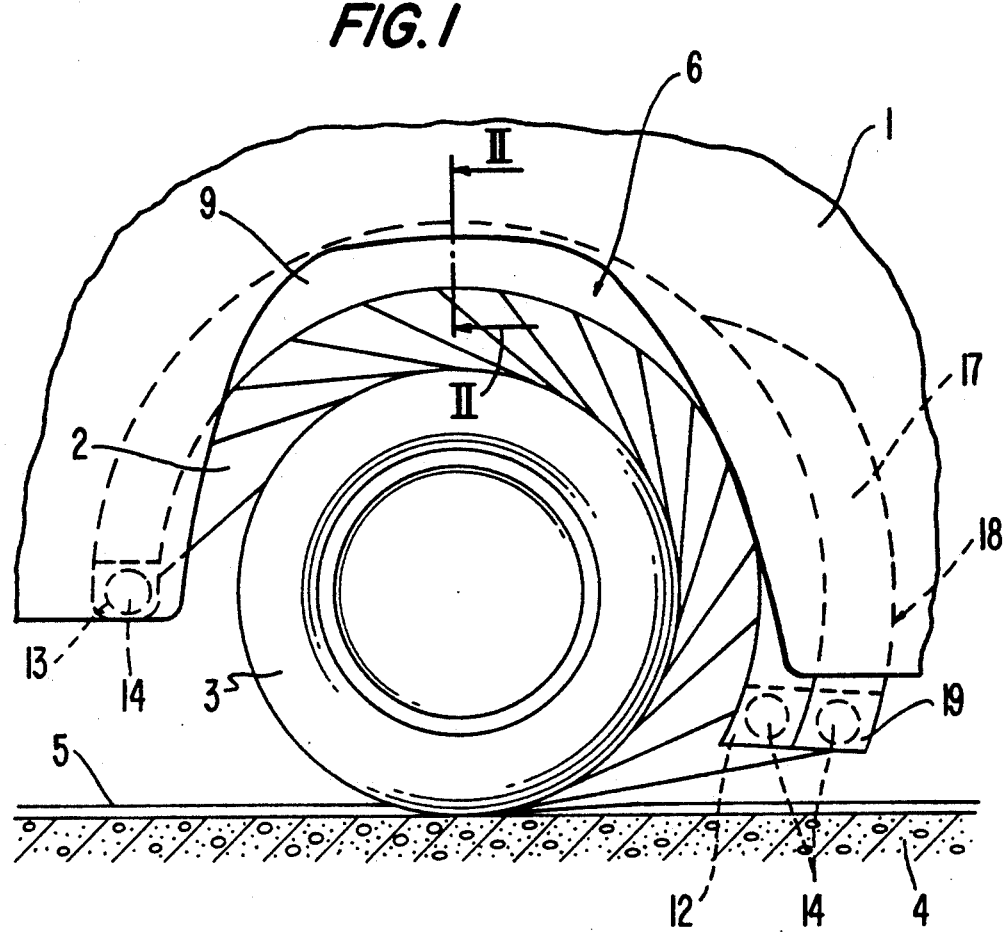
FIG. 1 is a side view of a device in accordance with the present invention, in its installed position, for collecting and discharging the splashed water thrown up by a vehicle wheel.

In FIG. 1, a fender 1 of a motor vehicle can be seen in part in the region of a wheel arch 2, in which a vehicle wheel 3 rolls on a roadway 4 on which rainwater 5 has accumulated. Behind the surface of the wheel 3 in contact with the roadway, the rainwater 5 picked up by the tread of the tire is thrown up as splashed water from the tread, as indicated by straight trajectory lines.

In order to ensure that the drops of splashed water thrown up will not burst on impinging on the peripheral wall lying opposite the rolling periphery of the wheel 3 and then become turbulent, which would result in undesirable spray formation, a device 6 is fastened on the peripheral wall of the fender 1 to enable the splashed water to be collected and discharged to the roadway 4 in the region of a smooth flow under the vehicle floor.

The device 6, which extends over the entire width of the wheel arch 2, has a flat rectangular shape in overall cross-section and extends substantially concentrically to the rolling periphery of the wheel arch 2. In front of the wheel 3 it ends at the bottom edge of the fender 1, while the end of the device 6 lying behind the wheel 3 projects downwards beyond the bottom edge of the fender.

Figure 2:
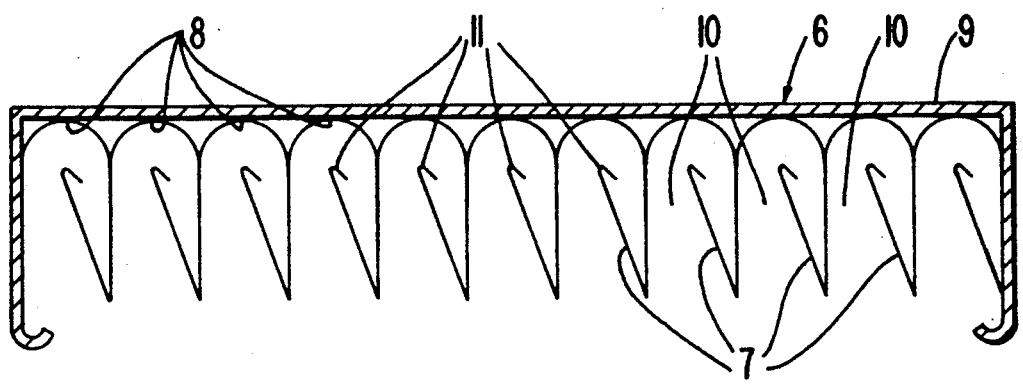
FIG. 2 is a vertical cross-section along line II—II in FIG. 1.

As can be seen in connection with FIG. 2, the device 6 comprises eleven collection channels 7 which extend in the longitudinal direction of the wheel arch 2 and thus parallel to the central longitudinal axis of the motor vehicle, and which are spaced apart side by side. All the collection channels 7 have the same V-shaped cross-section which is constant over their length, with the wedge edge of all the collection channels 7 facing the rolling periphery of the wheel 3.

One of the two boundary walls of each collection channel 7 extends, viewed in cross-section, parallel to the plane of rotation of the wheel 3, and the other boundary wall forms an angle of about 20 degrees. Each of the collection channels 7 is carried by an associated guide vane 8, which is formed integrally with the boundary wall of the collection channel 7 extending parallel to the plane of rotation of the wheel 3. The guide vane 8, which thus adjoins the lateral boundary wall of the collection channel 7 to form a flush surface therewith, is curved semicircularly, viewed in cross-section, and its radius of curvature is substantially adapted to the inside width of the collection channel opening. The collection channel opening is thus covered over its entire length by the associated guide vane 8, which arches over the freely projecting boundary wall of the collection channel 7 at a distance therefrom.

The guide vanes 8 of all the collection channels 7 are joined together along both longitudinal sides, so that together they form a continuous arched wall surface. On its outer periphery and on both narrow sides, this arched wall is enclosed by and fastened in an inner wing 9 having a U-shaped cross-section and made of impact-resistant plastics material. Alternatively, it is also possible for the arched wall to be attached directly to the peripheral wall of the fender 1.

Since the guide vanes 8 provided with the collection channels 7 are combined to form an arched wall, the boundary walls of neighboring collection channels 7 form at the same time two guide walls of a wedge-shaped collection passage 10.

Figure 3:
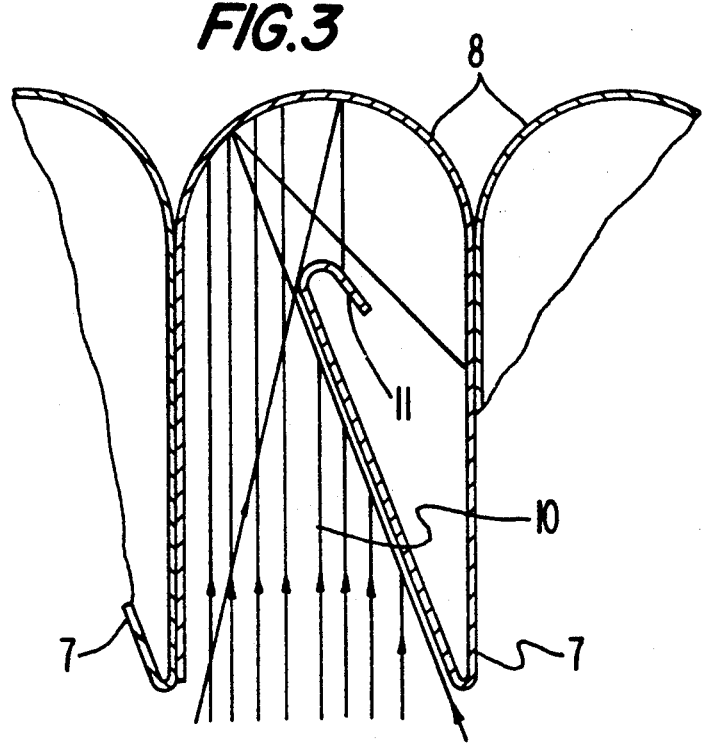
FIG. 3 is, on a larger scale, a detail of the vertical section shown in FIG. 2.
Figure 4:
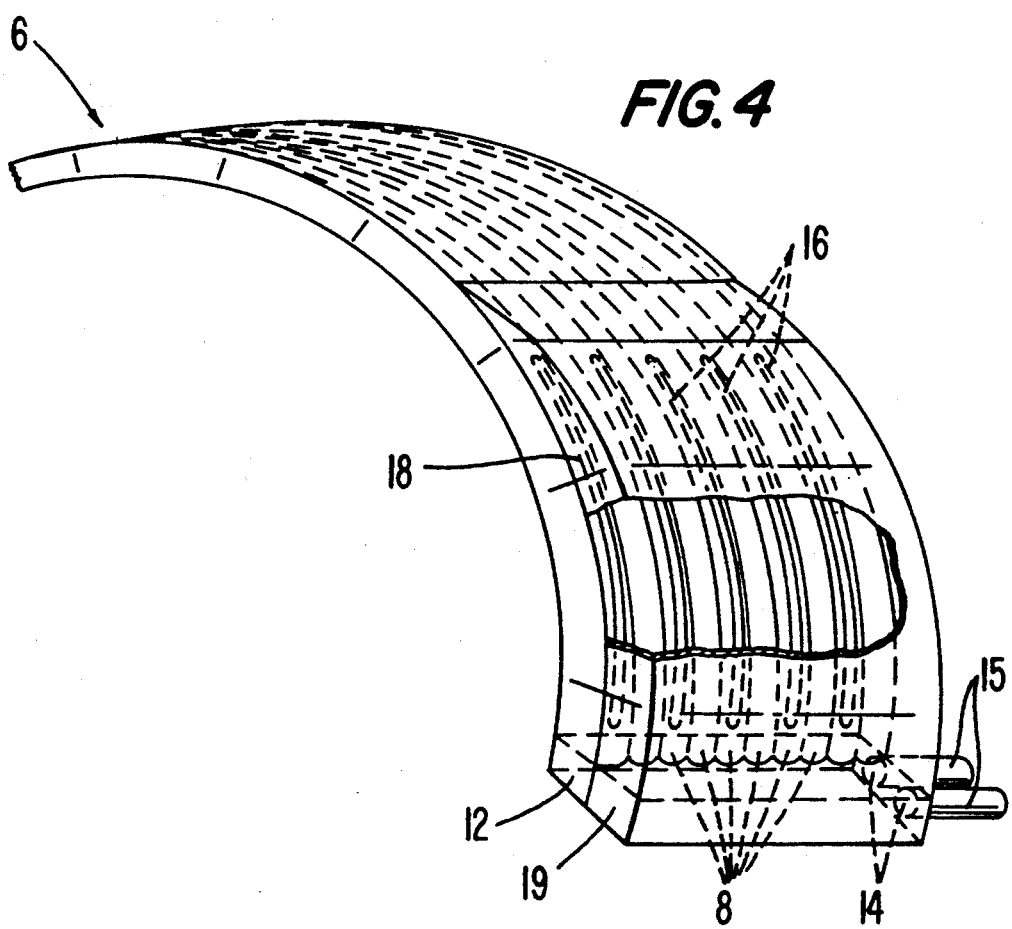
FIG. 4 is a perspective view from the rear of the device.

As can be seen in connection with FIG. 3, the drops of splashed water, whose trajectories are indicated by lines with arrows, almost all impinge on the quarter-circle arc of the guide vanes 8 which lies at the side of the collection channel opening, because of the guide action of the collection passage 10. Most of the drops of splashed water impinge on the guide vane 8 at a markedly more acute angle than 90 degrees to the tangent of the quarter-circle arc at the point of impact, so that they are flushed along the periphery of the guide vane 8 into the collection channel 7, in which they are collected.

In order to ensure that the fewest possible drops of water flushed into the collection channel 7 can be flushed out of the latter again, the edge zone of the freely projecting boundary wall of the collection channels 7 is provided with a deflector edge 11 which projects obliquely into the inside cross-section of the collection channel 7. The deflector edge 11 is formed from a widened portion on the edge side, which widened portion is bent over about 180 degrees in a narrow semicircular curve. By means of this hook, shape drops of water flushed up to the deflector edge 11 are once again subjected to return flushing and flushed back into the cross-section of the collection channel 7.

In the collection channels 7, which are curved lengthwise, the collected splashed water flows, substantially without being affected by turbulence in the wheel arch, down to the two ends of the device 6, on each of which a water chamber 12 and 13 respectively is disposed. The bottom of the water chambers 12, 13 are closed. These water chambers 12, 13 receiving the splashed water have a circular outlet opening 14 only in their side wall facing the center of the vehicle to enable the splashed water which has reached the water chambers 12, 13 to flow out to the roadway 4 at the side of the wheel track. Additionally, each outlet opening 14 of the device 6 can be enclosed by a short pipe 15 extending under the vehicle floor in the direction of the center of the vehicle.

The accumulation of splashed water is particularly great in the bottom, steeply downwardly inclined region of the length of the device 6 behind the wheel 3. To achieve in this region a greater absorptive capacity of the device 6, each alternate guide vane 8 in this region of the length is perforated by an overflow opening 16, which extends as a narrow slit along the central longitudinal axis of the guide vane 8. All the overflow openings 16 lead into a common outlet duct 17 disposed behind the perforated region of the length of the guide vanes 8. The outlet duct 17, which is rectangular in cross-section, is bounded on three sides by the walls of a tray-like member 18 and on the fourth side by the guide vanes 8.

The tray-like member 18, which is likewise curved lengthwise concentrically to the rolling periphery of the wheel 3, likewise ends at the bottom in a water chamber 19, which is disposed at the same height as and directly behind the water chamber 12. In respect of the discharge of water through a side outlet opening 14 provided with a short pipe 15, it is also of similar construction to the water chamber 12. At the top end, the tray-like member 18 tapers in wedge shape to merge into the peripheral wall of the inner wing 9, so that it takes up no installation space above the wheel 3.

The addition to the device 6 of the outlet duct 17 has the effect that part of the splashed water impinging on the guide vanes 8 is thrown through the overflow openings 16 and impinges on the peripheral wall of the tray-like member 18, so that it runs down in the outlet duct 17 to the water chamber 19 and flows off from the latter onto the roadway 4.

In order to facilitate the handling of the functional unit, particularly in its installation in the wheel arch 2, the device 6 and the tray-like member 18 are joined together to form a single constructional unit. This constructional unit can be attached to the vehicle with the aid of fastening screws or other customary detachable fastening means.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for collecting and discharging splashed water thrown up by a vehicle wheel, comprising a plurality of recessed rebound walls in the form of curved guide vanes spaced apart side by side and mounted at a vehicle wheel arch in a position such that openings to the guide vanes face a wheel tire tread, and a plurality of collection channels joined to a wall of the guide vanes such that access openings to the channels face an associated concave surface of the guide vanes so that a portion of impinging splashed water is thrown back from the guide vanes into the associated collection channel defined by a freely projecting boundary wall extending at an angle inwardly toward the rebound wall and having at a free end thereof a deflector edge portion extending toward the access opening of the associated collection channel, the collection channels being inclined downwards in a longitudinal direction, wherein the rebound walls are arranged to cover over the access openings of the collection channels and are each, viewed in cross-section transverse to the longitudinal direction of the vehicle, in the form of arcuately curved guide vanes whose concave surfaces face the vehicle wheel and the access openings of the associated collection channel such that a major part of the impinging splashed water from the curved guide vanes is deflected by return flushing into the collection channel access openings.

2. The device according to claim 1, wherein the wall of each of the guide vanes joined to the associated collection channel is joined along an edge side covering an associated collection channel to a lateral boundary wall of the collection channel so as to form a flush surface therewith.

3. The device according to claim 2, wherein each guide vane is formed integrally with the associated collection channel.

4. The device according to claim 2, wherein the guide vanes have an approximately semi-circular cross-section and are joined together along longitudinal sides thereof to form a constructional unit.

5. The device according to claim 2, wherein the collection channels have a V-shaped cross-section, with the deflector edge connected at an edge of the freely projecting boundary wall of the collection channels and projecting into the access opening of the associated collection channel.

6. The device according to claim 5, wherein the deflector edge is curved in a hook shape.

7. The device according to claim 1, wherein all collection channels extend parallel to a central longitudinal axis of the wheel arch and, viewed over an overall length thereof, are curved approximately concentrically to a rolling periphery of the wheel.

8. The device according to claim 7, wherein a water chamber is provided at least at one end of the collection channels and has a lateral outlet opening and is operatively connected in common at lower portions of all the guide vanes and the collection channels to permit collected splashed water to flow off in a desired manner onto the roadway.

9. The device according to claim 7, wherein steeply downwardly inclined portions of the guide vanes behind the vehicle wheel have an overflow opening so as to lead into an outlet duct at a bottom portion of the collection channels.

10. The device according to claim 9, wherein the outlet duct is connected to the guide vanes arranged in a row, and viewed in cross-section, is bounded by a tray-like member extending therearound.

11. The device according to claim 10, wherein the tray-like member is formed at a bottom end thereof as a water chamber provided with a lateral outlet opening.

12. The device according to claim 10, wherein the collection channels and the tray-like member are joined together to form a unitary constructional unit.

* * * * *